United States Patent
Mitchell

[15] 3,678,734
[45] July 25, 1972

[54] ANALYSIS OF FLUIDS

[72] Inventor: Douglas Mitchell, Tarrytown, N.Y.
[73] Assignee: Technicon Instruments Corporation, Tarrytown, N.Y.
[22] Filed: Oct. 1, 1970
[21] Appl. No.: 77,073

[52] U.S. Cl. ............................................. 73/61.1 R
[51] Int. Cl. ............................................. G01n 11/00
[58] Field of Search ..................... 73/61.1 R, 61 R, 53

[56] References Cited

UNITED STATES PATENTS

| | | | |
|---|---|---|---|
| 3,523,733 | 8/1970 | Kling et al. | 73/61 R X |
| 3,422,667 | 1/1969 | Hrdina | 73/61.1 R X |

Primary Examiner—Louis R. Prince
Assistant Examiner—Joseph W. Roskos
Attorney—S. P. Tedesco and S. E. Rockwell

[57] ABSTRACT

Automatic apparatus is described for the analysis of two or more constituents of interest present in widely varying concentrations in liquid samples by a common analytical device or detector selective with respect to such constituents. The liquid samples are directed successively along the apparatus as in initial stream, which is divided into two or more streams. The two or more streams are differentially diluted and reacted, so as to be accommodated by the common detector, prior to being passed alternatively and in succession to the common detector.

9 Claims, 3 Drawing Figures

Patented July 25, 1972

3,678,734

INVENTOR
DOUGLAS MITCHELL
BY
ATTORNEY

ANALYSIS OF FLUIDS

The present invention relates to the analysis of fluids.

A particular application of the invention is to the analysis of fluids in the form of liquid solutions.

A system for automatic chemical analysis of samples in solution is known or has been proposed which consists of a sample feeding device, sample processing devices, which carry out operations such as addition of reagents, and a detector which measures a physical property of the processed sample solution. This physical property is related to the concentration of one or more components of the sample, and usually has a linear relationship with concentration over a limited concentration range. It is usually desirable to carry out measurements within this linear range.

A known or already proposed system for the automated analysis of more than one component in a sample is built up from a number of single channel systems, each containing sample processing devices and a detector. This type of system is necessary when the analytical technique used is not very selective, and a single (processed) sample solution cannot be used to measure the appropriate physical property of each component.

Some detectors which could be used in automatic analysis are highly selective and can be used to measure the concentration of a number of components in one sample solution. An apparatus for simultaneous multi-element analysis by atomic fluorescence spectroscopy described in my U.S. Pat. No. 3,619,061, issued on Nov. 19, 1971 and assigned to Technicon Instruments Corporation, is one such detector. A limitation may arise with such detectors, however, when some components are present in much greater amounts in the sample than other components, such that it is impossible to treat an analytical sample so as to obtain a single solution giving a linear physical property concentration relationship for all components.

In these cases, it is necessary or at least desirable to prepare two or more sample solutions of different concentrations.

The invention provides automatic analysis apparatus for the analysis of sample fluids for two or more constituents of interest comprising means for forming two or more streams of a sample fluid, means for adding a diluent to at least one of the sample streams to effect differential dilution of the fluid samples in the respective streams, and a common detector arranged to receive fluid samples from the respective streams in succession.

For example, in the case where the fluid is a solution of two components at a relatively high concentration and two components at a relatively low concentration, one of the streams may be diluted for the detection of the relatively highly concentrated components and the other stream may remain undiluted for the detection of the two components which are at a relatively low concentration.

The two streams may be formed by dividing one stream into two.

While either of the two streams is passing through the detector, the other stream may conveniently pass to waste.

One form of analysis apparatus according to the invention will now be described, by way of example with reference to the accompanying drawings in which.

Figure 1:
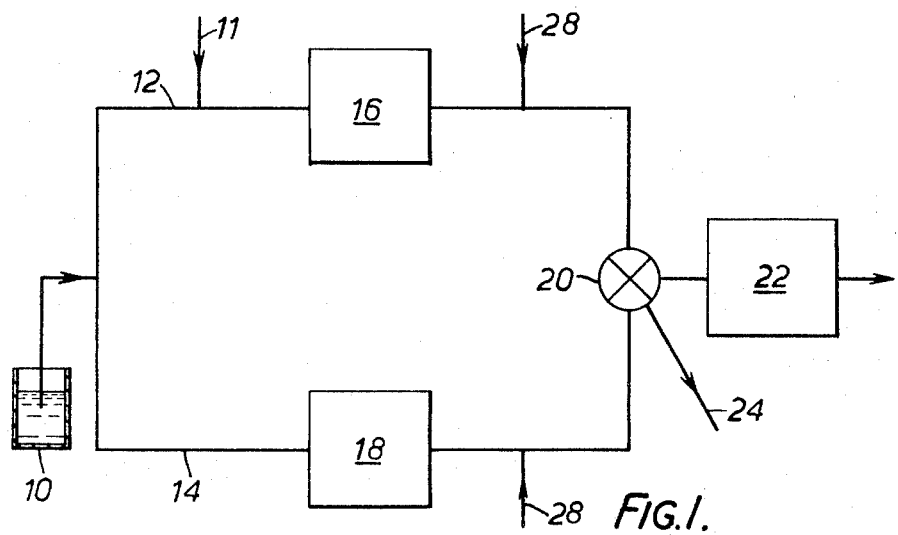
FIG. 1 is a diagram of an apparatus for the automatic analysis of a solution in accordance with the invention.

Referring to the drawings, the illustrated apparatus is designed for the automatic analysis of a sample solution for four components I, II, III and IV. Components I and II are present at relatively high concentrations, and components III and IV are present at relatively low concentrations. The sample solution is pumped from a sample holder 10 and divided into two streams 12 and 14 (FIG. 1). Pure solvent is pumped into stream 12 along a conduit 11, producing a diluted solution of the appropriate concentration for analyzing components I and II. Both streams pass through processing devices 16 and 18, respectively as necessary to a valve 20 which passes one stream to a detector 22 and the other to waste 24.

In operation, the valve 20 is set first to pass say, stream 12 to the detector 22 and stream 14 to waste 24, while the detector 22 is programmed to measure the concentrations of components I and II. When this measurement is complete, the valve 20 is automatically switched so as to pass stream 14 to the detector 22 and the detector 22 measures the concentration of components III and IV.

With such a continuous flow system it is necessary to wash out the system with an appropriate wash liquid between each sample. The system can be arranged so that the sample solution from holder 10 reaches the valve 20 along one path, for example, that of stream 12, and is passed to the detector 22, while inert wash liquid reaches the valve 20 along the other path (that of stream 14 in the example given) and is rejected to waste 24. This efficiently utilizes available analysis time.

It may be necessary to use internal standards for some analyses with this system. Also, the system may not have time to complete its read out operations for components I and II in stream 12, before it is necessary to begin measuring the concentrations of components III and IV in stream 14.

It is desirable to use only one substance as an internal standard for all components, and it is desirable to permit one set of data (from components I and II for example) to be processed and read out, whilst the other components are being analyzed. This may be achieved with the following apparatus.

Figure 2:
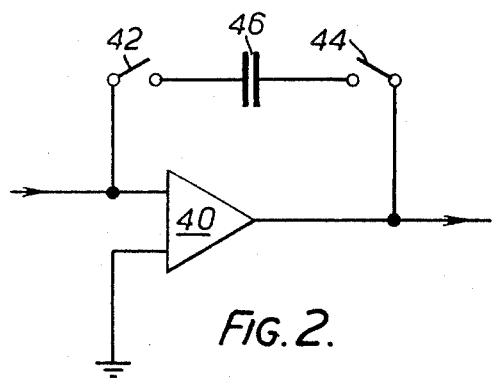
FIG. 2 is a diagram of one integrator circuit which may form part of the apparatus of FIG. 1.
Figure 3:
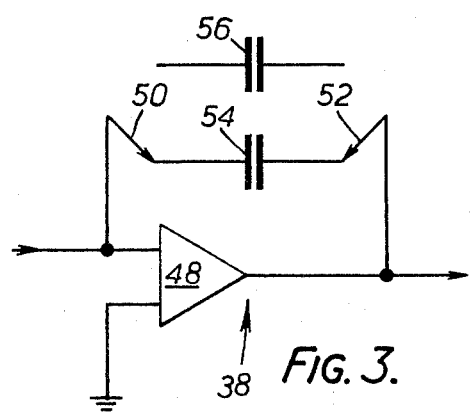
FIG. 3 is a diagram of another integrator circuit which may form a part of the apparatus of FIG. 1.

A solution containing an internal standard is passed into both streams along conduits 28 as shown in FIG. 1. The detector 22 is fitted with signal storing devices, for example, five integration circuits which are not shown but are referred to as 30, 32, 34, 36 and 38. Signals $S_I$, $S_{II}$, $S_{III}$ and $S_{IV}$ arising from components I, II, III and IV respectively, are stored on integration circuits 30, 32, 34 and 36 respectively, each of which is of the type shown in FIG. 2, consisting of an operational amplifier 40, switches 42 and 44 and capacitor 46. Signals $S_{2R}^{12}$ and $S_{2R}^{14}$ arising from the internal standard in streams 12 and 14, respectively, are stored by integration circuit 38, which is of the type shown in FIG. 3, consisting of an operational amplifier 48, switches 50 and 52 and two capacitors 54 and 56.

The apparatus is operated as follows. When stream 12 passes the detector 22, switches 42 and 44 in each of the two integration circuits 30 and 32 are closed, and capacitor 54 is connected by switches 50 and 52 to the operational amplifier 48 in integration circuit 38. Signals $S_I$, $S_{II}$ and $S_{2R}^{12}$ are processed and stored on the appropriate capacitors. Valve 20 then switches to permit stream 14 to be fed to the detector 22. Switches 42 and 44 in integration circuits 30 and 32 are opened, switches 42 and 44 in integration circuits 34 and 36 are closed, and switches 50 and 52 in integration circuit 38 switch from capacitor 54 to capacitor 56. Signals $S_{III}$, $S_{IV}$ and $S_{2R}^{14}$ are then measured and stored on the appropriate capacitors. Meanwhile, capacitor 46 in integration circuits 30 and 32 and capacitor 54 in integration circuit 38 each hold electrical charges proportional to their respective signals. These capacitors are connected into appropriate read out circuits and the signals $S_I/S_{2R}^{12}$ and $S_{II}/S_{2R}^{12}$ are read onto a read out device (not shown). When measurement is completed on stream 14, signals $S_{III}/S_{2R}^{14}$ and $S_{IV}/S_{2R}^{14}$ are read out while $S_I$, $S_{II}$ and $S_{2R}^{12}$ are being measured on the next sample.

What is claimed is:

1. Apparatus for the analysis of sample fluids for two or more constituents of interest comprising:
    means for passing fluid samples successively as a first stream,
    means connected to said passing means for forming second and third streams, each of said second and third streams including portions of said successive fluid samples in said first stream,
    means for diluting said sample portions in at least one of said second and third streams, respectively whereby said sample portions in said second and third streams are differentially diluted, means for introducing a standard solution into selected ones of said second and third streams, common analytical means selective with respect to said two or more constituents of interest and said standard solution and operative to accommodate said differentially diluting sample portions in said second and third streams, said common analytical means including means for storing signals arising from the analysis of said constituents of interest in said first and second streams and additional means for storing signals arising from said standard solution, said storing means and said additional storing means being cooperative to express the ratio of the signal arising from a corresponding constituent of interest and the signal arising from said standard solution, and valving means for alternately directing said second and third streams to said common analytical means.

2. Apparatus according to claim 1 wherein said valving means includes means for directing each of second and third streams alternately between said common analytical means and waste, one of said second and third streams being directed by said valving means to waste at any one time.

3. Apparatus according to claim 1 further including means for processing said second and third streams, respectively, for at least one of said two or more constituents of interest and prior to being directed by said valving means to said common analytical means.

4. Apparatus according to claim 1 wherein said common analytical means is operative to analyze said two or more constituents of interest in phase with the operation of said valving means and in phase with the operation of said passing means.

5. Apparatus according to claim 1 where the operation of said storing means is phased with the operation of said valving means.

6. Apparatus according to claim 1 wherein said common analytical means includes means for generating an electrical signal indicative of the concentration of said constituents of interest and said standard solution, and said storing means include integrating circuits.

7. Apparatus according to claim 1 wherein said common analytical means comprises means for quantitatively analyzing said differentially diluted sample portions directed thereto through said valving means for said two or more constituents of interest, and means for indicating the respective quantities of said two or more constituents of interest in each of said differentially diluted sample portions.

8. Apparatus according to claim 7 wherein said indicating means includes means for providing electrical signals indicative of the respective quantities of said two or more constituents of interest in each of said differentially diluted sample portions.

9. Apparatus according to claim 7 wherein said common analytical means includes means for storing said electrical signals indicative of the respective quantities of said two or more constituents of interest.

* * * * *